(12) United States Patent
Ong et al.

(10) Patent No.: US 9,306,656 B2
(45) Date of Patent: Apr. 5, 2016

(54) WIRELESS SIGNAL PROPAGATION APPARATUS

(71) Applicant: ROLLS-ROYCE PLC, London (GB)

(72) Inventors: Max Chien Yee Ong, Dalkeith (AU); Haydn Ashley Thompson, Sheffield (GB); Huw Llewelyn Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 202 days.

(21) Appl. No.: 14/039,443

(22) Filed: Sep. 27, 2013

(65) Prior Publication Data

US 2014/0106665 A1 Apr. 17, 2014

(30) Foreign Application Priority Data

Oct. 11, 2012 (GB) .................................. 1218240.8

(51) Int. Cl.
| | | |
|---|---|---|
| *H04B 7/145* | (2006.01) | |
| *H01Q 1/00* | (2006.01) | |
| *H01Q 3/06* | (2006.01) | |
| *H01Q 9/04* | (2006.01) | |
| *H01Q 9/30* | (2006.01) | |

(52) U.S. Cl.
CPC ............... *H04B 7/145* (2013.01); *H01Q 1/007* (2013.01); *H01Q 3/06* (2013.01); *H01Q 9/0407* (2013.01); *H01Q 9/30* (2013.01)

(58) Field of Classification Search
CPC ........... H04B 10/1141; H04B 10/1143; H04B 5/0093
See application file for complete search history.

(56) References Cited

U.S. PATENT DOCUMENTS

| | | | | |
|---|---|---|---|---|
| 5,994,977 | A * | 11/1999 | Taya .......................... | H01P 3/06 333/111 |
| 7,280,033 | B2 * | 10/2007 | Berkman ................ | H04B 3/542 340/12.32 |
| 7,436,321 | B2 * | 10/2008 | White, II ............. | H02J 13/0086 340/538 |
| 7,796,025 | B2 * | 9/2010 | Berkman ................. | H04B 3/54 340/12.37 |
| 8,253,516 | B2 * | 8/2012 | Miller, II .................. | H01P 3/10 333/24 R |

(Continued)

FOREIGN PATENT DOCUMENTS

| | | |
|---|---|---|
| EP | 0 544 538 A2 | 6/1993 |
| EP | 0 954 045 A2 | 11/1999 |

(Continued)

OTHER PUBLICATIONS

Search Report issued in British Application No. 1218240.8 dated Nov. 12, 2012.

(Continued)

*Primary Examiner* — Bobbak Safaipour
(74) *Attorney, Agent, or Firm* — Oliff PLC

(57) ABSTRACT

There is provided apparatus for propagation of a wireless signal through a barrier comprising a first antenna for location on a first side of the barrier, a second antenna for location on a second side of the barrier and a waveguide. The waveguide comprises a conducting member passing through the barrier between the first and second sides. The conducting member is held within an insulator sleeve such that it is spaced from a surrounding metal wall of the waveguide. A wireless signal received by the waveguide on the first side of the barrier is transmitted through the barrier by Transverse Electro-Magnetic (TEM) mode propagation along the waveguide is re-radiated on the second side.

17 Claims, 4 Drawing Sheets

(56) References Cited

U.S. PATENT DOCUMENTS

| | | | | |
|---|---|---|---|---|
| 8,269,583 B2* | 9/2012 | Miller, II | .......... | H04L 12/40013 333/240 |
| 8,344,829 B2* | 1/2013 | Miller, II | .................. | H01P 3/06 333/24 R |
| 8,593,238 B2* | 11/2013 | Miller, II | .................. | H01P 3/06 333/24 R |
| 2008/0099447 A1* | 5/2008 | Ando | ................ | H01J 37/32192 219/121.43 |
| 2011/0132658 A1* | 6/2011 | Miller, II | .......... | H04L 12/40013 174/70 R |
| 2011/0133865 A1* | 6/2011 | Miller, II | .................. | H01P 3/06 333/24 R |
| 2011/0133867 A1* | 6/2011 | Miller, II | .................. | H01P 3/06 333/240 |
| 2011/0136432 A1* | 6/2011 | Miller, II | .................. | H01P 3/10 455/41.2 |
| 2012/0080210 A1* | 4/2012 | Camp, II | ................ | H01B 11/06 174/34 |
| 2013/0076460 A1* | 3/2013 | Miller, II | .................. | H01P 5/12 333/24 R |
| 2014/0085129 A1* | 3/2014 | Westerling | ............... | H01Q 9/28 342/124 |

FOREIGN PATENT DOCUMENTS

| | | |
|---|---|---|
| JP | A-11-313022 | 11/1999 |
| JP | A-2002-204240 | 7/2002 |
| JP | A-2004-228691 | 8/2004 |
| JP | A-2007-194903 | 8/2007 |
| WO | WO 2010/105654 A1 | 9/2010 |

OTHER PUBLICATIONS

Dec. 12, 2013 Search Report issued in European Patent Application No. 13 18 6296.

\* cited by examiner

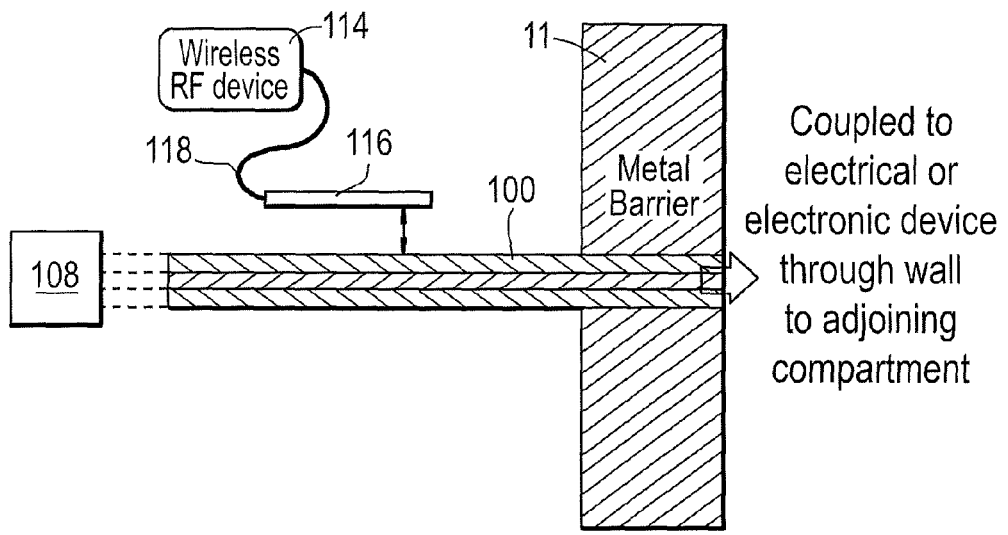
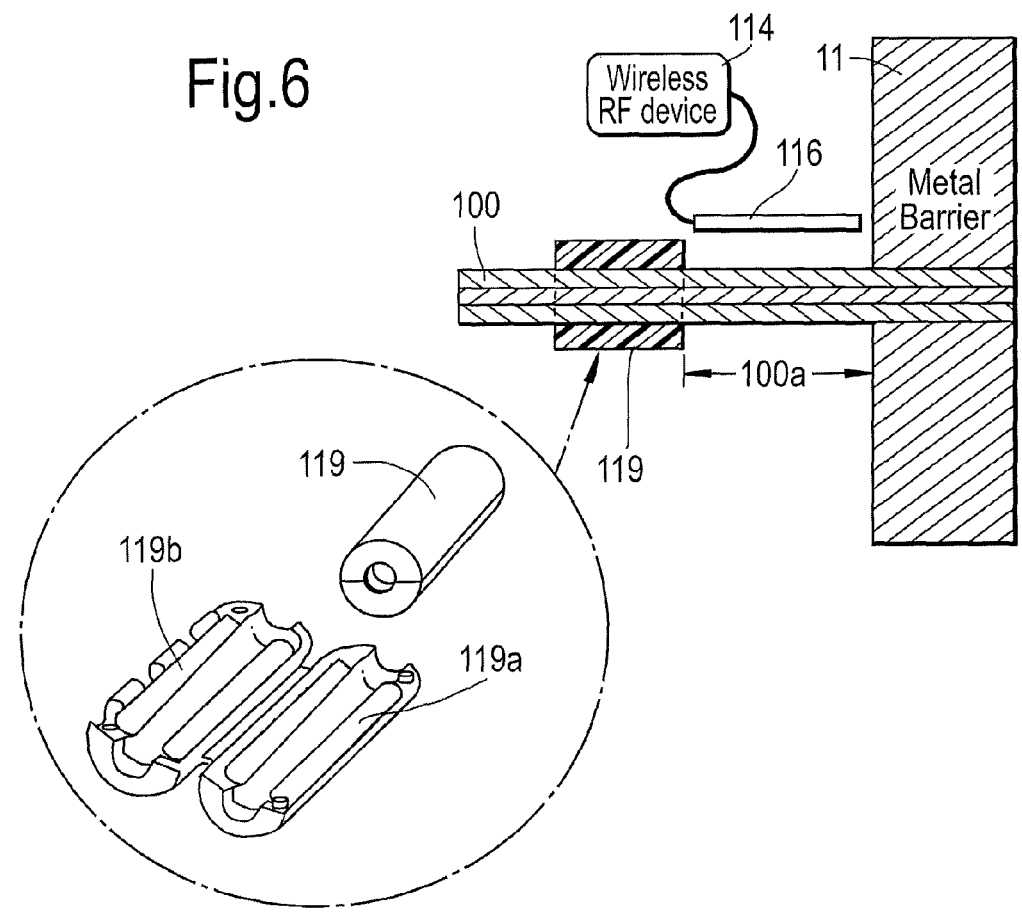

WIRELESS SIGNAL PROPAGATION APPARATUS

BACKGROUND OF THE INVENTION

The present invention relates to apparatus for wireless signal propagation and, more particularly, apparatus for allowing wireless signal propagation through walls.

Wireless communication systems, based on radio frequency (RF) or microwave frequency technologies, are becoming increasingly popular in replacing conventional wired systems, for example in machine monitoring, control and automation systems. Wireless signals have the ability to penetrate various mediums depending on their dielectric properties.

However it is known that wireless technologies face difficulties communicating directly through metal barriers. Under conditions where a direct line-of-sight between a transmitter and a receiver is inhibited by a metal barrier, transmission of a wireless signal typically relies on indirect propagation paths or, so-called, 'scatter' wherein signals are reflected off the surfaces of other mediums to reach the desired receiver.

Communication is physically impossible where there is no direct or indirect propagation path available between transmitter and receiver, such as when the two entities are located in separate, sealed metal compartments. Conventional techniques for penetrating electronic signals through a metal barrier between two compartments typically involve the use of traditional electrical cabling inserted via a conduit. However conventional electrical wiring and cabling through metal requires a significantly large diameter hole (typically 10's of millimetres) to be made through the barrier. This is often not possible due to design restrictions, for example in enclosures that are required to contain fluid or to be sealed and/or pressurized in use. Holes of such magnitude can also compromise the structural integrity of the barrier/wall being penetrated.

Furthermore, if one attempts to provide a blank hole in the metal barrier to join the airspace between the two different compartments, and thereby bridge the metal barrier, the diameter needed to accommodate wireless signals using RF and microwave frequencies (i.e. for industrial, scientific and/or medical uses) is typically also too large to provide a viable solution for many applications. The minimum hole diameter for conventional free-air wireless propagation through that hole is, for example, approximately 73 mm and above for 2.4 GHz or 35 mm and above for 5 GHz. Having such 'large' holes will have negative implications in complex metal structures that may be sealed, watertight, pressurized and/or contain oil, etc. in use.

Furthermore, existing holes for electrical wires and cabling are usually filled with insulated wire cores (i.e. more metal) which effectively partially fills the hole with barrier material.

Other relevant technologies that exist in this area of communications based in the acoustic frequency range (e.g. ultrasonic communications) or eddy currents. However, such techniques are inherently high-powered and only allow very low data rates. They also suffer reliability issues due to susceptibility to noise and therefore remain substantially unusable for many applications, especially in and around metallic equipment and machinery that suffer from mechanical noises, vibration and other random noises.

It is an aim of the present invention to provide apparatus which can allow propagation of wireless signals through barriers for a wider variety of applications, or else for applications in which the above-described techniques are unsuitable.

It may be considered an additional or alternative aim to provide apparatus which mitigates one or more of the above described problems.

BRIEF SUMMARY OF THE INVENTION

According to a first aspect of the invention there is provided apparatus for propagation of a wireless signal through a barrier, the apparatus comprising a first antenna for location on a first side of the barrier, a second antenna for location on a second side of the barrier and a waveguide, the waveguide comprising conducting member arranged to pass through said barrier between the first and second sides, the conducting member being held spaced from a surrounding metal wall of the waveguide, whereby a wireless signal received by the waveguide on the first side of the barrier is re-radiated on the second side.

The conducting member may be held within an insulating material. The conducting member may be contained within an insulating sleeve, which may be elongate in form. The insulating material may fill the surrounding metal wall of the waveguide, for example the space within the metal wall. The insulating material may hold the conducting member for example such that it is aligned with or along a longitudinal axis of the waveguide or metal wall thereof.

The provision of a waveguide having a conducting element therein may allow a wireless signal to propagate through the barrier by Transverse Electro-Magnetic (TEM) mode propagation along the waveguide.

The conducting member may be of finite length, which is greater than the length of the barrier and/or surrounding metal wall. The conducting member typically comprises a first portion for location on the first side of the barrier, a second portion for location on a second wall of the barrier and an intermediate portion there-between. The intermediate portion may be substantially equal in length to the thickness of the barrier. The insulating material or sleeve may run substantially the entire length of the intermediate portion.

In one embodiment a first portion of the conducting member protrudes from the first side of the barrier. The first antenna may comprise the first portion of the conducting member. The first portion of the conducting member may protrude beyond the sleeve and may be exposed.

In one embodiment a second portion of the conducting member protrudes from the second side of the barrier. The second antenna may comprise the second portion of the conducting member. The second portion of the conducting member may protrude beyond the sleeve and may be exposed.

The first and/or second antenna may be integral with, or attached to, the conducting member.

The first and/or second antenna may be attached to the conducting member on respective first and/or second sides of the barrier. A first portion of the waveguide, for example at a first end thereof, may comprise a connector for attachment of the first antenna. A second portion of the waveguide, for example at a second end thereof, may comprise a connector for attachment of the second antenna.

The conducting member may be elongate in form and may comprise a wire, cable or rod. The conducting member may comprise a conducting element. The conducting member may comprise a single or co-axial cable.

The surrounding metal wall may be concentric with the conducting member and insulating material. The metal wall may define an elongate internal space through which the conducting member extends. The surrounding metal wall may be shaped so as to define a generally tubular interior void.

The barrier may comprise a through-bore or hole having opposing openings on the first and second sides thereof.

In one embodiment the barrier comprises a metal barrier and the surrounding metal wall comprises an internal wall or surface through the metal barrier. The through bore may provide a discontinuity through the metal barrier bounded by one or more internal surfaces of the metal barrier. The metal barrier may be a substantially solid and continuous metal barrier, e.g. save for the through bore.

In one embodiment the surrounding metal wall comprises a metal sleeve arranged to be disposed about the insulating material. The metal sleeve may be insertable through a correspondingly shaped bore, recess or duct in the barrier. The metal sleeve may be close fit within a through-bore.

The barrier may define an internal enclosure on the first side of the barrier, for example such that the second side is an external side or surface of the enclosure. The enclosure may be a chamber. The barrier may comprise a plurality of adjoining barrier members or walls which may be angled so as to define a three-dimensional enclosure.

The wave guide may comprise a further wall interposed between the conducting member and the surrounding metal wall. The further wall may be an intermediate wall and may surround the conducting member. The further wall may be concentric with respect to the conducting member and/or surrounding wall. The further wall may be metallic and may extend substantially the length of the waveguide.

In one example the first antenna comprises a wireless signal transmitter spaced from the conducting member, for example spaced from a first portion of the conducting member protruding from the first side of the barrier. For example the transmitter may be located a short distance from the conducting member and electrically isolated therefrom. This may be beneficial in allowing existing wiring or cabling to be used for the transmission of wireless signals through an existing metal barrier.

The second antenna may comprise a wireless signal receiver spaced from the conducting member, for example spaced from a second portion of the conducting member protruding from the second side of the barrier. For example the receiver may be located apart from the conducting member and electrically isolated therefrom.

The invention may allow bridging of wireless communication signals between the interior and the exterior of an isolated metal compartment, or else between compartments separated by a metal barrier. The apparatus itself can be extremely small and unobtrusive with a diameter of, for example, 0.9 mm if using a 0.5 mm single core with 0.2 mm insulation layer. Thus the invention may allow a relatively small hole (i.e. a few mm's or less) to be provided in the barrier, whilst allowing for transmission of conventional wavelengths of wireless communication signals.

The waveguide may otherwise be referred to as a barrier 'penetrator' or 're-radiating arrangement'. The 'penetrator' or 're-radiating element' may strategically placed across a metal, or other, barrier to wireless communication signals.

The waveguide and/or apparatus as a whole may beneficially be physically and electrically isolated from any of the wireless communication devices inside the enclosure/compartment.

In one embodiment, the conductor member may comprise existing cabling (power, data, etc.), allowing it to be used as a re-radiating element (without interference to existing systems) allowing signals to be bridged between the interior and exterior of a compartment without the need to amend or introduce new cabling. This can allow fast introduction/retrofit of new control and monitoring functionality into systems with minimal installation cost and modification to the system.

In an embodiment in which the conductor comprises cabling or other conductor member of excess length (e.g. existing cabling), an electro-magnetic interference (EMI) choke or filter may be provided on the conductor on the first and/or second side of the barrier. The length of the conductor between the choke and waveguide (i.e. the surrounding metal wall or barrier) may define the first or second antenna. A choke on each side of the barrier may define both the first and second antennas. The choke/filter may comprise an inductor, ring, block or core, such as, for example, a ferrite member or bead. The distance between the waveguide and the choke/inductor may be predetermined and may be fraction of a wavelength of the wireless signal, such as a quarter or half wavelength. The choke may be attached about the conductor in the form of a cuff member. The cuff may be clipped or otherwise permanently or releasably fixed about the conductor. A ferrite core alone may be sufficient, with or without wire coils wrapped there-about.

The invention may have particular importance for the marine sector where limited time and access is available for installation. In oil-filled or radioactive environments the invention may provide significant cost and time savings as it eliminates the need to bore and seal new holes, normally required by conventional electrical cabling, allowing data to be transmitted from areas subject to adverse conditions.

Any of the features defined above in relation to any one aspect of the invention may be applied to any further aspect.

BRIEF DESCRIPTION OF THE DRAWINGS

Practicable embodiments of the invention are described in further detail below by way of example only with reference to the accompanying drawings, of which:

FIG. 2b shows a three dimensional view of a portion of the arrangement of FIG. 2a;

FIG. 5 shows an example of a conventional cable arrangement adapted for use according to the present invention;

FIG. 6 shows a further example of a conventional cable arrangement adapted for use according to the present invention;

DETAILED DESCRIPTION OF THE INVENTION

Figure 1:
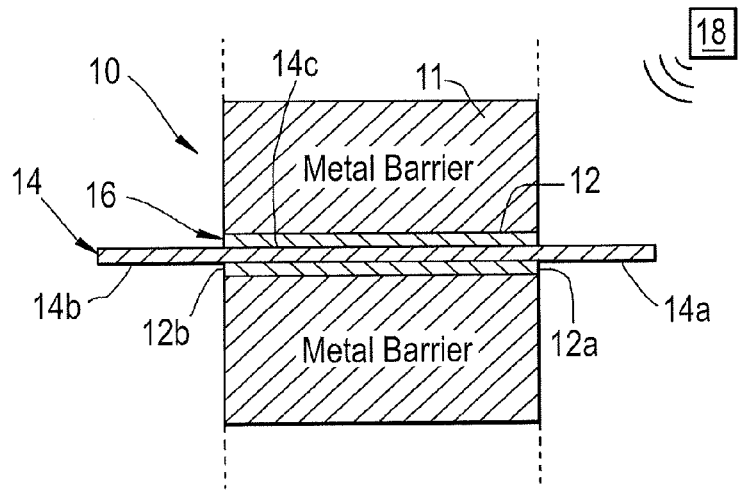
FIG. 1 shows a section through a first example of the present invention.

There exist numerous examples of compartments or enclosures having walls or casing which are substantially impenetrable to, or else provide a significant barrier to, the passage of conventional wireless communications signals. Some examples of such scenarios include aeronautical or automotive engine or propulsion compartments, such as gearboxes, thrusters (e.g. azimuth thrusters), fuel tanks or the like, but may also include other storage tanks, piping or enclosures for machinery or people. For example any road, rail or aerospace or marine transportation typically involves metal enclosures such as vessel compartments (e.g. spaced by bulkheads), goods containers or the like. Further examples may include pipes, such as oil and gas pipelines; industrial pumping equipment; clean rooms; security enclosures; nuclear containment vessels, amongst others.

The invention provides apparatus for bridging the communications signals between the interior and exterior of any such enclosures through the barrier in question such that wireless signal transmission apparatus can be used more freely in scenarios in which its use has previously been hampered.

The basic premise of the invention constitutes the use of a passive 'penetrator' or 're-radiating element', inserted through a very small hole (mm's or less) in the barrier, that is physically and electrically isolated from any wireless transmitter or receiver (i.e. electronic) devices. In the context of the present invention, wireless communication signals may be considered to include microwaves and radio waves, typically having a wavelength of greater than 1 mm or 1 cm. The upper limit of such conventional wavelengths is typically of the order of 10 m or 100 m Turning to FIG. 1, there is shown a first example of a penetrator device 10 according to the invention. In this example, a metal barrier 11 is provided with a through-bore or passage 12, preferably having a width/diameter dimension of the order of 1 or 2 cm or less. The length of the passage, laterally through the wall (i.e. wall thickness), typically results in an elongate passage having a length dimension greater than its width.

The passage 12 through the barrier 10 is defined by inwardly facing surface of the metal barrier itself such that the passage 12 has a metal surface or wall about the internal void of the passage. The passage is typically circular in cross section, although quadrilateral (e.g. rectangular) or other polygonal cross sections are possible. The passage 12 has a substantially constant width/height or diameter dimension along its length.

The passage 12 is open at each end thereof such that it has a first opening 12a on one side of the barrier 11 and a second opening 12b on the opposing side. The openings are typically substantially opposite one another such that the passage is generally perpendicular to at least one of the surfaces of the barrier 11.

An inner conductor element 14 is located within the passage 12. The conductor element is generally centrally aligned such that it follows the longitudinal axis of the passage 12.

An insulator material 16 is provided within the passage 12, so as to surround or encapsulate the conductor element 14 therein. The insulator material holds the conductor element within the passage, spaced from passage wall, thereby electrically isolating the conductor element 14 from the passage wall. The insulator material in this embodiment also prevents removal or relative movement between the conductor and passage. The insulating material substantially fills the passage.

The insulator material is provided in the form of a shroud or sleeve for the conductor element 14.

In this embodiment, the passage and enclosed inner conductor 14 are surrounded by material of the barrier medium such that the barrier itself bounds the passage and is electrically isolated from the conductor element by the insulating shroud/sleeve.

The inner conductor element 14 is of greater length than the passage 12 (i.e. greater than the width/thickness of the barrier 11) such that the conductor element 14 protrudes from, or overhangs, each side of the barrier. Thus the conducting element defines a uniform member having first 14a and second 14b protruding portions and an intermediate portion 14c maintained within the barrier passage 12.

The protruding portions 14a, 14b, or at least a portion thereof, are exposed and may serve as antenna sections of the conducting element 14 in use.

In use, a conventional wireless signal transmitter 18 may be located on one side of the barrier 11, for example within an enclosed chamber, compartment or room, and may emit electromagnetic (EM) radiation in the form of a communication signal according to one or more conventional standards, such as, for example, GSM®, Wi-Fi®, Bluetooth®, or similar. In one embodiment the invention may be tailored to a 60 GHz frequency or a frequency range thereabout. The medium of the metal barrier is substantially impenetrable to the wireless signal.

However the wireless signal is received at antenna end portion 14a and propagates through the passage 12 via the penetrator element, and is subsequently re-radiated from the opposing antenna portion 14b on the other side of the barrier. In this regard it is notable that the passage in the barrier cannot itself support conventional propagation of wireless signals of such EM wavelength down its length through free-air (or other dielectric medium) using conventional Transverse Electric (TE) mode or Transverse Magnetic (TM) mode. However, with the conductor element inserted, the EM waves are able to propagate along the passage via Transverse Electro-Magnetic (TEM) mode propagation. In TEM mode, with the penetrator element in place, EM waves can propagate down the passage which is akin to a metallic waveguide but with a diameter much smaller than is applicable conventional waveguides for TE and TM modes.

The outer conductor or shielding is provided by the metal barrier material itself to support TEM mode propagation along the inner conductor element.

Compared to conventional electrical/data cabling, the small hole for the penetrator described above (in the order of a few millimetres or less) is easier to seal up in watertight, oil-filled, pressurized, or other controlled environments. A tiny hole of such size is also less likely to impact on structural integrity of the metal barrier in comparison to larger holes typically required for conventional electrical cabling.

The performance and therefore efficiency of the penetrator and/or antennae can be optimised for any given radio or microwave frequency/wavelength being employed. For the enclosed section of the conductor member, this can be achieved by varying the ratio of diameter of the conductor element to the diameter of the passage (and therefore the spacing between them) also taking into account the complex dielectric properties of the penetrator, barrier, and insulator material. For the exposed ends or antenna, optimization may include altering the length of the antenna to suit the medium on the respective side of the barrier. In some examples, the antenna length on either side of the barrier may be different (i.e. producing an asymmetrical device), for example if the barrier provides an interface between different material/fluid phases (e.g. with a gas on one side and a liquid on the other).

A further example of a suitable penetrator device 20 is shown in FIG. 2. In this embodiment, the conductor element 14 and passage 12 in the barrier 11 are substantially as described above. However the packing/insulating arrangement within the passage, which serves to isolate the inner conductor 14 from the barrier medium, is modified. A concentric conducting sleeve 24 is provided within the passage 12 about the inner conducting element 14, typically in a coaxial arrangement. The conducting sleeve 24 is spaced from the conductor element 14 by an inner insulating layer or sleeve 22 provided immediately about the conductor element 14. Accordingly the combined conducting sleeve 24 and element 14 form the waveguide arrangement for signal transmission by TEM mode propagation as described above.

An outer insulating layer 26 is provided between the conducting sleeve 24 and the interior surface of the metal barrier defining the passage 12. The outer insulating layer is provided in the form of an outer sleeve which serves to isolate the conducting sleeve 24 from the barrier and also to fill the passage void in the barrier.

Figure 2A:
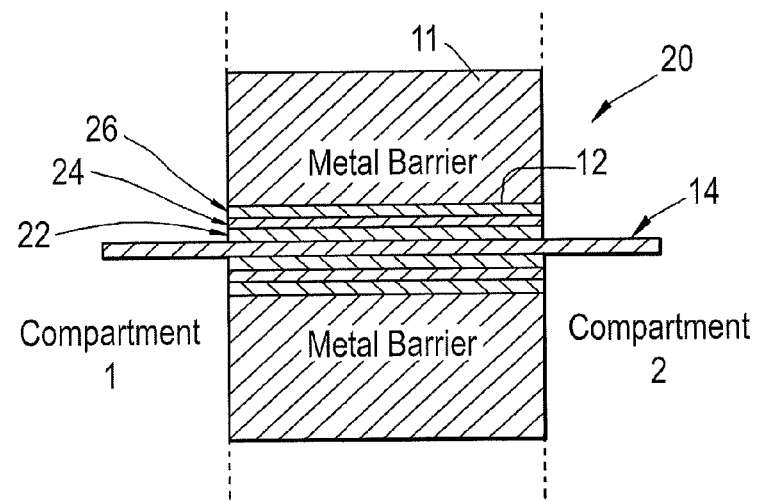
FIG. 2a shows a section through a second example of the present invention.
Figure 2B:
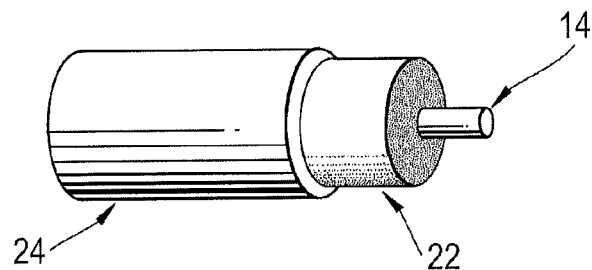

The arrangement of FIG. 2 effectively uses a section of RF co-axial cable as the barrier penetrator, positioned in the barrier passage. A small performance enhancement can be achieved using a specifically tuned RF coaxial with its own outer conductor 24. However a slightly larger diameter passage is required for any given frequency or wavelength to accommodate the additional layers of the arrangement. Despite this increase in diameter over the single-conductor penetrator if FIG. 1, the minimum diameter achievable using such a configuration still offers a saving over conventional cabling. Also the embodiment of FIG. 2a can be used in non-metal barriers.

Whilst the exposed ends of the conductor element 14 described above provide a simple antenna configuration, more complex variations may be applied in various different embodiments to improve performance.

Figure 3:
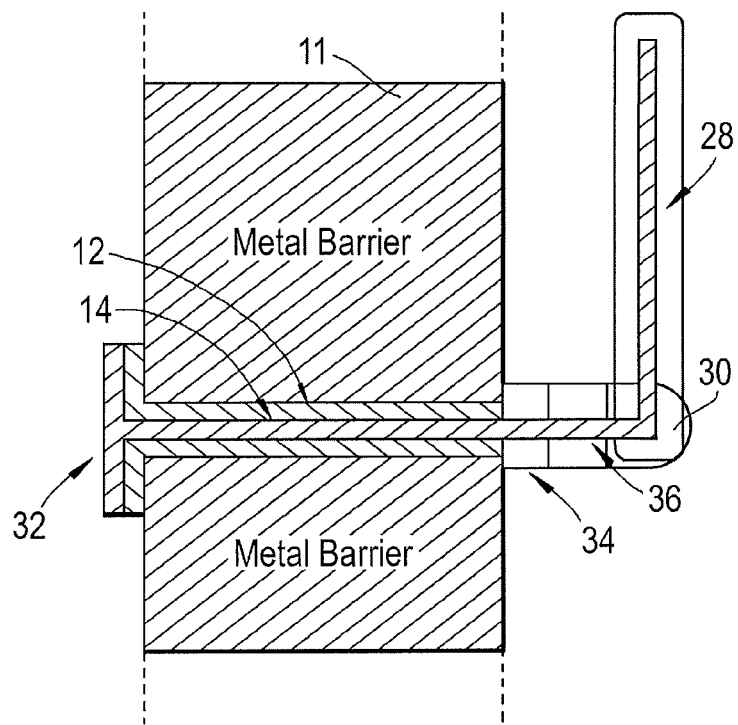
FIG. 3 shows a further example of the invention with different antenna configurations.

FIG. 3 shows example variations of the antennas. In the embodiment of FIG. 3 different antennas are provided at the end-sections of the penetrator device. However either such antenna could be provided at both ends if desirable. Any such antenna configurations could be applied to either penetrator of FIG. 1 or 2.

In FIG. 3, the conductor element 14 is connected at its first end (i.e. the receiver side of the barrier 11 on which the wireless communication signal transmitter 18 is located in use) to a dipole antenna 28, which is typically elongate in form. The antenna 28 may comprise a housing and/or orientation means 30 for orienting the antenna 28 at an oblique or perpendicular angle relative to the conductor element 14. The orientation means may be adjustable, such as by way of a hinge or ball-and-socket or other angular adjustment mechanism.

On the opposing side of the barrier 11, there is shown an example of a directional antenna, in this example taking the form of a patch antenna 32, which provides an antenna arrangement having low geometrical profile or depth such that it is relatively unobtrusive, compact and simple to mount. The patch antenna is of conventional design, typically having a pair of spaced metal sheets, for example of rectangular shape. The sheets may be separated by a dielectric material.

A patch antenna can also be specifically tuned to give more directional propagation characteristics that can enhance performance in highly reflective environments (e.g. metal compartments) to reduce undesirable effects of scatter.

The patch antenna is spaced/isolated from the barrier 11 by an insulator material. In this embodiment the insulator material between the barrier and the patch antenna is the same as the layer 16 used in the penetrator device. The patch antenna may be formed with the penetrator device such that the insulator material is common to both devices. In such an embodiment, the antenna may act as an end stop formation, such that the penetrator device can be inserted into the passage to a depth that is limited by the antenna formation thereon.

Various other antenna designs may be used, including single wire elements, rods, other patches or similar. In a further development of the invention, the antenna, typically a patch antenna, could be provided in a recess in the barrier such that the outer radiating surface of the antenna is substantially flush with the outer surface of the barrier. In such an embodiment, a relatively shallow recess may be provided in the side of the barrier to accommodate the depth of the antenna and any surrounding insulator material. The recess may be concentric with the through-bore in the barrier and insulator material in such an embodiment may be provided in the recess between the barrier and the antenna so as to maintain a ground plane positioned behind a centre axis of the patch. In such an embodiment, the material and dimensions of the antenna may be optimised for the desired implementation in order to maintain acceptable efficiency.

The device may be fitted at either or both ends with an antenna coupling/mounting formation 34, for example in the form of a plug or socket formation. The antenna is provided with a corresponding (e.g. opposing) coupling formation 36 such that it can mate and form a sturdy connection with the formation 34. Any of a threaded, push-fit or other latching arrangement may be used to ensure a close and/or sealing fit between the penetrator and antenna. This allows a modular-type device to be provided, such that a common design of penetrator member can be provided, which can be connected to one of a variety of antenna dependent on the particular instance of use. Additionally or alternatively, such an antenna coupling may simplify installation of the device.

The end of the re-radiating conductor element 14 antenna coupling combination may allow simple connect-disconnect capability, as and when required. This also allows interchangeable antennas to suit specific application requirements without a need to modify the entire penetrator design (e.g. connect an extended antenna lead to re-locate the penetrator's input/output position).

The length of the element 14 and surrounding insulator material 16 is variable, depending on the thickness of the barrier and the frequency/wavelength used. The exposed lengths on either ends of the inner conductor can be single wire elements, rods, or flat patches resembling various antenna designs.

Other design considerations for the device can include physical packaging issues (size, weight, direction). The cross-sectional shape of the passage can be circular, square or rectangular, although circular holes are more typical with the diameter being the dominant parameter. In rectangular holes, the longer side becomes the dominant parameter.

Figure 4:
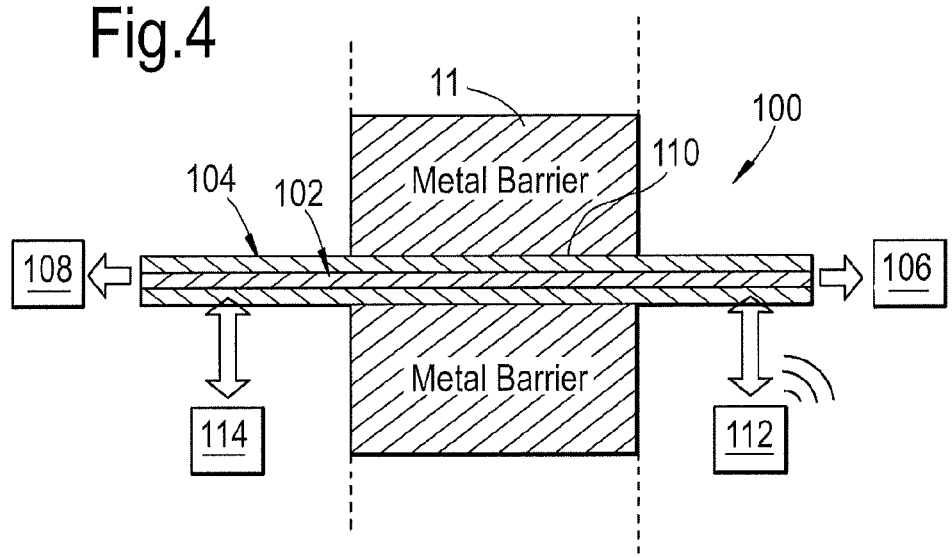
FIG. 4 shows an example of a conventional cable arrangement.

Turning now to FIGS. 4 to 6, there are shown systems for using existing wiring/cabling for wireless signal penetration through a barrier. In such an embodiment, an existing physical wire or cable assembly itself can act as the penetrator or re-radiating element for TEM-mode propagation of wireless signals across a barrier 11.

In such an embodiment, the existing wire 100 typically comprises a conductor 102 held within an insulator sleeve or sheath 104. The conductor provides an electrical connection between existing electrical or electronic devices 106, 108 on either side of the barrier or further afield. Thus the wire passes through an existing passage 110 in the barrier. For sealed environments, the use of an existing wire and barrier arrangement is beneficial in that the passage in the barrier is suitably sealed by the existing wiring.

Wireless communication signals can thus be transmitted to the existing wiring from a transmitting device 112 on one side of the barrier and re-radiated from the existing wiring to a receiver device 114 on an opposing side of the barrier 11. The roles of the transmitter and receiver can also be reversed to allow two-way communication or one-way communication in the opposing direction.

Turning now to FIG. 5, it can be see that the existing wires or cabling 100 to be used are electrically isolated from the wireless transmitter/receiver/transceivers 114, but remain electrically coupled to the existing electrical or electronic device 108, to which they were originally intended to provide a connection. Only one half of the arrangement is shown for simplicity, although the arrangement will typically be mirrored on the opposing side of the barrier.

In this embodiment, the antenna element 116 is connected to the transmitter/receiver device 114 by a wired connection, such a link 118. Thus the antenna may be mounted as required relative to the existing wire 100.

In this example the antenna 118 is spaced from the wire 100, and more specifically from the conductor 102, by a predetermined distance. The antenna may be spaced from the wire by the medium that is contained within the compartment or outside thereof, such as air, or any other suitable medium.

However it may be of further benefit tom mount the antenna 118 onto the sheath 104, for example using a solid material so as to ensure the desired spacing. For example a portion of the existing wiring may be held within a vice, clamp or other suitable retaining arrangement to which the antenna is mounted or connectable.

It has been found that, for optimum performance, the antenna 116 of a wireless transmitter, receiver or transceiver 114 is placed in close proximity to the penetrator (e.g. the existing wire), for example at a distance less than one wavelength or less than or equal to half a wavelength, in order to propagate wireless signals (EM waves carrying data) via the penetrator. The antenna has been found to be best positioned around a quarter wavelength distance (e.g. 30 mm @2.4 GHz or 13 mm at 5 GHz) from the conductor 104.

Also it has been found that the best performance is achieved when the antenna element 116 (e.g. which is elongate in form) is orientated in parallel to, e.g. alongside, a portion of the length of the penetrator as shown in FIG. 5.

Whilst such a specific arrangement is not strictly required for the system to operate (i.e. because the same antenna, located anywhere within the space of a compartment can still radiate wireless signals to the penetrator), it has been found that either or both of the above placement criteria can result in a system which is significantly more practicable. Such a system can avoid reduced energy levels caused by dissipation of signal energy across the distance (i.e. as a function of radio output power of the wireless device).

Turning now to FIG. 6 there is shown an optional further development which may be applied to the system of FIGS. 4 and 5. Accordingly, like features will not be described again for brevity. In such a configuration, the effective antenna length of the existing wires or cabling 100 can be optimised using one or more inductor, such as an EMI choke 119.

Existing cables are relatively long and generate greater losses than bespoke antennas in the context of using them as "antenna ends" on either side of a barrier to re-radiate wireless signals. It has been found that the "effective antenna length" of the existing wires or cabling 100 can be limited by applying an EMI choke 119, such as a ferrite bead device, onto the protruding length of cable/wire 100 on either or both sides of the barrier. The length of wire/cable 100a between the choke 119 and the barrier 11 thus defines the length of the effective antenna provided by the exposed wire/cable.

The EMI choke 119 may take the form of a cuff member as shown in FIG. 6. Such a choke may comprise opposing halves 119a and 119b which can be fastened about the wire/cable 100. The opposing halves in this embodiment are hinged and have a clip fastening at their respective open sides so as to fasten the choke about the wire 100. However various other suitable clamping or fastening formations may be provided to allow the choke 119 to be retro-fitted to existing wire/cable in-situ without requiring the existing wire to be severed.

The choke 119 has the benefit of allowing the effective re-radiating or receiving portion of the wire/cable 100 to be tuned for more efficient performance. The spacing of the choke from the waveguide/barrier can thus be selected to tune to a desired signal frequency/wavelength.

The choke has the additional/alternative benefit that it can reduce or limit the amount of EMI being introduced into the existing cable 100, for example to mitigate against the impact on the present invention on the normal operation of the existing wire/cable 100. Although a ferrite bead dissipates some of that energy, the choke can prevent reflections/oscillations that could otherwise cause interference to the wireless signal being injected/extracted over that existing cable.

The characteristics of the ferrite bead may be selected, through material choice and physical dimension, to best suit the wireless signal and/or cable properties. For example, to suit 2.4 GHz signal choke could be retro-fitted to the cable 100 exactly 31 mm from the barrier to create a quarter-wave "antenna" end of an existing cable run.

The embodiments of FIGS. 4 to 6 have been found to be operable for wires and cabling of the following types, although other types have not been excluded:
Single core and multi-core wires/cables
AC and DC electrical power cables
Earth/ground cables
Electronic data/signalling cables
Co-axial cables
Shielded twisted pair cables (e.g. RJ-45, CAT5e Ethernet, etc)

Using the above-described arrangement, it is possible to propagate wireless signals over shielded cables. In such an arrangement, the shielding material, e.g. the outer conductor of the cable configuration (akin to conductor 24 shown in FIG. 2b), acts as the conductor element of the penetrator through the passage in a metal barrier. The inner surface of the metal barrier passage acts as the outer conductor. In the case of a co-axial cable, the outer conductor (solid shield or braiding) can thus serve as the inner conductor of the penetrator through the metal barrier.

For shielded/unshielded data carrying cables, the EM energy from the wireless signal is relatively low compared to that of the signal being carried by the cable. It is also operating at a completely different frequency to that of the original data signal of the wired communication being carried by that cable. Therefore, this technique does not substantially impinge on the quality or integrity of the original data being transmitted across that existing cable.

For a given radiated radio or microwave power output, the performance of a penetrator using existing wires and cables can be inferior to the previously described, purpose-built penetrator of FIG. 1 or 2. This is because the solution of FIGS. 4 and 5 is inherently 'lossy', having longer lengths and being electrically coupled to other electrical/electronic equipment. However, for the intended target applications of physical range of around 5 or 10 meters or less, the performance for relatively low-power RF devices is more than acceptable to sustain good data rate and signal strength above the noise floor. This concept has been experimentally verified and proven useful for typical wireless-through-barrier performance. For higher power devices (e.g. Wi-Fi device of up to 1 W output), the physical range capabilities will, in general, be less restrictive (i.e. dependent on the signal-to noise ratio).

Any of the above embodiments may be used to re-radiate wireless signals from one compartment or room to another, or else to disseminate wireless signals from a compartment more widely beyond the barrier wall.

The propagation medium on either side of the penetrator is typically, but not necessarily, air. The medium on either side of the barrier may be any other dielectric medium such as a gas, mixture of gasses, liquid (e.g. oil), solid (e.g. plastics, composites, rubber) or gels etc. The invention may also accommodate multiphase applications.

For optimum performance, the techniques in this invention are used in combination with a robust wireless communication protocol including error correction, optimum choice of frequency channel selection, and deployed with suitably optimized data rate for that specific environment. The configuration of the wireless communication system can be continuously adapted to suit the changing environment conditions in and around the penetrator location to achieve optimum performance, if necessary.

Although substantially straight waveguide/penetrator devices are described above, which are typically allow a straight bore to be provided in a wall, it will be appreciated that curved or bent guides may be provided in the event that it is beneficial to provide a change in direction during passage through the barrier.

The wireless signals may be used for data communication between individual electronic devices (computers, sensors, controllers, or any other electronic device with wireless transmitter, receiver or transceiver). For example the invention may be applied in domestic and commercial buildings or other installations (e.g. below ground) where wireless signals have poor penetration through walls. The use of penetrators in strategically placed locations in such buildings can boost wireless signal reception throughout the building.

The system of the invention may be used in any or any combination of: sensing; monitoring; control and/or automation systems, typically for machinery. The particular target application of this invention is the transmission of wireless signals in and/or out of metal compartments in marine equipment. It is particularly suited to complex metal equipment environments are typically oil-filled, sealed and often pressurized. The invention is also beneficial where physical access is limited (e.g. below the waterline, below ground level or buried deep inside equipment) or where it is not possible to route conventional electrical cabling due to unsuitable environments, cost or complexity.

In one embodiment, the invention may be applied to radio-active environments (e.g. in powerplants), where there is a need to retrofit additional sensors and monitoring equipment. Existing wires/cables running into or out of the harsh zones can advantageously be 'piggy-backed' in the manner described above, thereby avoiding the significant cost and time associated with boring and sealing new holes required by conventional electrical cabling.

Figure 7:
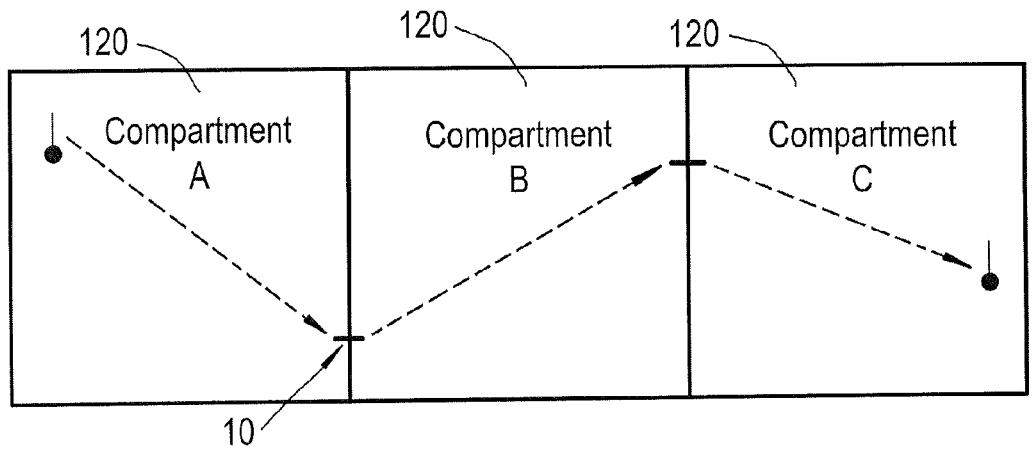
FIG. 7 shows a schematic view of a wireless signal transmission path through compartments using the present invention; and, FIG. 8 shows schematic view of a further communication system through compartments.
Figure 8:
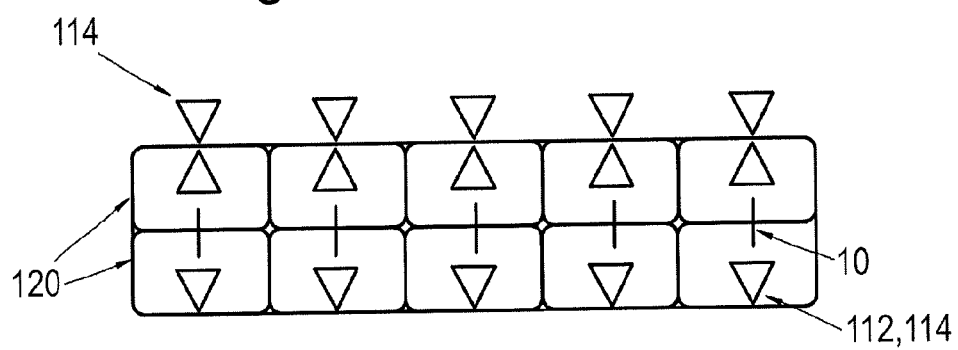

In one implementation, as shown in FIGS. 6 and 7, the invention may be used to propagate wireless signals around a network of compartments by allowing penetration of signals there-between. Such an embodiment may be particularly suited to a plurality of container or else to ship, submarine or other vessel having sections separated by bulkheads However the invention may otherwise be relevant to other vehicular (e.g. in aircraft or trains) or fixed structures having bulkheads or sections. For example as shown in FIG. 6, devices 10 according to the invention can be used to transmit signals between neighbouring compartments 120.

Turning to FIG. 7, for transmission of the signal over a wider area of the network or beyond, for example over a distance between the bow and stern of a vessel, one implementation of the invention enables a network to be generated across a plurality of compartments, for example in which each compartment comprises a penetrator device 10 according to the invention. The penetrator may span an external wall of each compartment. Accordingly the signal from the interior of one compartment may be communicated to a common exterior of the network/vessel, e.g. to deck of the vessel, from where it can be communicated over the length of the vessel or off the vessel as required. This may require less power as fewer compartments need to be penetrated (i.e. fewer penetrators need to be used in series). Accordingly the network may comprise a plurality of penetrator devices in parallel to allow communication with the interior of a plurality of individual compartments or containers.

Once the signal has passed to the exterior of the compartments, it may be beneficial to convert to a different frequency (e.g. from 2.4 GHz, to 700 MHz), typically having a greater wavelength, to transmit over a greater distance, such as for example over the length of the vessel or entirety of the network. This is because lower frequencies require less power to transmit a given distance, and can diffract around obstructions better. It could be conceived that this is the method used for implementing a wireless network on a ship, through sending all data up through the vessel to the deck where it would then be sent to its destination.

Any of the above-described arrangements may also be applied to Radio Frequency Identification (RFID) technologies. RFID is typically lower frequency, lower power and has significantly less penetration than RF or microwave communications. In this context, the invention can help to increase the penetration of RFID signals which will help provide better range and coverage when scanning/locating RFID tags. RFID devices typically operate at different frequency channels, requiring penetrator designs to be physically adapted (tuned) to accommodate those frequencies. However there is some degree of overlap with conventional higher RFID frequencies such that penetrators for the radio/microwave spectrum may also accommodate RFID applications.

In any embodiment, the insulator material may be a dielectric. The insulator is typically solid such that it can fill the passage in the barrier. However a liquid or gas could be used, such as air, in the event that the passage can be sealed at its ends. This may require end cap formations that seal against the barrier about the ends of the passage. Typically, in such an embodiment, the conductor element can be held in tension within the passage.

The proposed invention, in contrast to existing techniques, allows a much smaller diameter hole through the barrier (millimetres or less), gives far higher data rate, requires less equipment parts (lower cost), is much easier to implement and install (reduced installation cost), reduces complexity and provides additional ability to re-use/piggy-back over any already-existing physical installations through that barrier (retro-fit advantage).

It will be understood that the present invention has been described in relation to its preferred embodiments and may be modified in many different ways without departing from the spirit and scope of the invention as defined by the accompanying claims.

The invention claimed is:

1. Apparatus for propagation of a wireless signal through a barrier, the apparatus comprising:
   a first antenna for location on a first side of the barrier,
   a second antenna for location on a second side of the barrier, and
   a waveguide, the waveguide comprising a conducting member arranged to pass through said barrier between the first and second sides, the conducting member being held spaced from a surrounding metal wall of the waveguide, the conducting member having a first end portion arranged to terminate on the first side of the barrier, a second end portion arranged to terminate on the second side of the barrier and an intermediate portion therebetween, wherein the first and second end portions are integral with the respective first and second antennas, wherein the first and second end portions protrude beyond the surrounding metal wall and provide the respective first and second antennas, whereby in use a wireless signal received by the waveguide on the first side of the barrier is transmitted along the waveguide and radiated on the second side.

2. Apparatus according to claim, 1 wherein in said use a wireless signal is transmitted through the barrier between the conducting member and the surrounding metal wall by Transverse Electro-Magnetic (TEM) mode propagation along the waveguide.

3. Apparatus according to claim 1, wherein the conducting member is held in the passage within an insulating sleeve interposed between the conducting member and the surrounding metal wall.

4. Apparatus according to claim 1, wherein the first and/or second end portion of the conducting member is exposed.

5. Apparatus according to claim 1, wherein the first and/or second end portion comprises a connector formation for the respective first and/or second antenna.

6. Apparatus according to claim 5, wherein the first and/or second antenna comprises a directional and/or actuable antenna device.

7. Apparatus according to claim 1, wherein the barrier is a metal barrier having a passage therethrough, the passage having opposing openings on the first and second sides of the barrier, the material of the metal barrier about said passage providing the surrounding metal wall of the waveguide.

8. Apparatus according to claim 7, wherein a coaxial cable having an inner conductor and an outer metal shield is disposed within the passage, the outer metal shield of the coaxial cable forming the conducting member of the waveguide.

9. Apparatus according to claim 1, wherein the surrounding metal wall comprises a metal sleeve disposed about the insulating material and arranged to be insertable in the barrier between the first and second sides thereof.

10. Apparatus according to claim 1, wherein the conducting member comprises an existing wire or cable passing through the barrier, the first antenna comprises a wireless signal transmitter spaced from a portion of the conducting member on the first side of the barrier, and the second antenna optionally comprises a wireless signal receiver spaced from a portion of the conducting member on the second side of the barrier.

11. Apparatus according to claim 10, wherein the first and/or second antenna are held at a predetermined spacing and orientation relative to the conducting member to permit signal transmission therebetween.

12. Apparatus according to claim 10, wherein the first and/or second antenna are held at a distance of one or two wavelength or less from the conducting member with respect to the wavelength of the wireless signal being transmitted, optionally wherein the spacing between the first and/or second antenna and conducting member is approximately a quarter of a wavelength with respect to the wavelength of the wireless signal being transmitted.

13. Apparatus according to claim 10, wherein the first and/or second antenna is elongate in form and is substantially parallel with the respective portion of the conducting member.

14. Apparatus according to claim 10, wherein an EMI (Electro-Magnetic Interference) choke is provided on the existing wire or cable on either or both sides of the barrier at a predetermined spacing from the barrier.

15. Apparatus according to claim 1, wherein the barrier comprises a wall of an enclosure, the first side being in the interior of the enclosure and the second side being external to the enclosure.

16. Apparatus according to claim 1, further comprising a wireless communication device on either or both sides of the barrier, wherein the conducting member of the waveguide is electrically isolated from the wireless communication device.

17. A wireless signal transmission network comprising a plurality of enclosures each having a barrier and apparatus according to claim 1.

* * * * *